(12) United States Patent
Waichulis

(10) Patent No.: US 9,534,657 B2
(45) Date of Patent: Jan. 3, 2017

(54) SHOCK ABSORBER SPRING WITH INTERNAL SHAFT

(71) Applicant: Robert Waichulis, Itasca, IL (US)

(72) Inventor: Robert Waichulis, Itasca, IL (US)

(73) Assignee: SHAMROCK INTERNATIONAL FASTENER, LLC, Itasca, IL (US)

( * ) Notice: Subject to any disclaimer, the term of this patent is extended or adjusted under 35 U.S.C. 154(b) by 0 days.

(21) Appl. No.: 14/825,275

(22) Filed: Aug. 13, 2015

(65) Prior Publication Data

US 2016/0053847 A1 Feb. 25, 2016

Related U.S. Application Data

(60) Provisional application No. 62/039,802, filed on Aug. 20, 2014.

(51) Int. Cl.

| | |
|---|---|
| *F16F 15/067* | (2006.01) |
| *D06F 37/22* | (2006.01) |
| *D06F 37/20* | (2006.01) |
| *F16F 3/06* | (2006.01) |
| *F16F 7/12* | (2006.01) |
| *D06F 37/24* | (2006.01) |
| *F16F 1/12* | (2006.01) |
| *F16F 3/12* | (2006.01) |

(52) U.S. Cl.
CPC ............ *F16F 15/067* (2013.01); *D06F 37/20* (2013.01); *D06F 37/22* (2013.01); *D06F 37/24* (2013.01); *F16F 1/123* (2013.01); *F16F 1/128* (2013.01); *F16F 3/06* (2013.01); *F16F 7/125* (2013.01); *F16F 3/12* (2013.01); *Y10T 74/2109* (2015.01)

(58) Field of Classification Search
CPC ................................. D06F 37/24; F16F 15/067
See application file for complete search history.

(56) References Cited

U.S. PATENT DOCUMENTS

| | | | | | |
|---|---|---|---|---|---|
| 1,290,023 | A | * | 12/1918 | Clarke ...................... | B60C 7/18 |
| | | | | | 152/262 |
| 4,997,222 | A | * | 3/1991 | Reed .................... | A47G 25/902 |
| | | | | | 24/429 |

(Continued)

FOREIGN PATENT DOCUMENTS

| | | | | |
|---|---|---|---|---|
| CA | 2513229 A1 | * | 3/2006 | ............. D06F 37/20 |
| DE | 19937488 A1 | * | 2/2001 | ............. B60K 13/04 |

*Primary Examiner* — Joshua J Michener
*Assistant Examiner* — Chiedu Chibogu
(74) *Attorney, Agent, or Firm* — Justin Lempel

(57) ABSTRACT

A shock absorber spring is provided. The shock absorber spring is constructed as a single unit having an internal shaft which passes back through the coils of the spring. A first end of the internal shaft is secured to a stationary object (such as the top of a washing machine) while the second end of the internal shaft is surrounded by the spring and hangs down in a generally vertical orientation. The second end of the shock absorber spring is then secured or hung to the heavy, moving object and allows the heavy, moving object to move in a restricted, desired manner by dampening and absorbing the vibrations of the object. The shock absorber spring has an internal travel limiter which may make contact with an extended bump located at the bottom of the internal shaft wherein the internal travel limiter contacts the extended bump and prevents the shock absorber spring from over compressing.

8 Claims, 3 Drawing Sheets

(56) References Cited

U.S. PATENT DOCUMENTS

| | | | | |
|---|---|---|---|---|
| D399,780 S | * | 10/1998 | Kauderer | D11/121 |
| 6,029,480 A | * | 2/2000 | Colombera | D06F 37/20 |
| | | | | 210/149 |
| 6,089,053 A | * | 7/2000 | Colombera | D06F 37/20 |
| | | | | 210/144 |
| 6,397,643 B1 | * | 6/2002 | Chang | D06F 37/24 |
| | | | | 68/23.1 |
| 6,474,113 B1 | * | 11/2002 | Park | D06F 37/24 |
| | | | | 68/23.3 |
| 6,964,412 B2 | * | 11/2005 | Costello | F16B 21/071 |
| | | | | 267/179 |
| D533,107 S | * | 12/2006 | King | D11/152 |
| 8,608,142 B2 | * | 12/2013 | Von Allmen | F16F 7/128 |
| | | | | 267/170 |
| 2011/0037359 A1 | * | 2/2011 | Munhoz | D06F 37/24 |
| | | | | 312/228 |
| 2011/0247372 A1 | * | 10/2011 | Miller | D06F 37/12 |
| | | | | 68/13 R |

\* cited by examiner

SHOCK ABSORBER SPRING WITH INTERNAL SHAFT

CROSS REFERENCE TO RELATED APPLICATIONS

The following application is based on and claims the priority benefit of U.S. provisional application Ser. No. 62/039,802 filed Aug. 20, 2014 currently; the entire contents of which are incorporated by reference.

BACKGROUND OF THE INVENTION

A shock absorber spring is provided. The shock absorber spring is especially suitable for hanging and controlling the movement of heavy oscillating articles, such as the tub of a washing machine. The shock absorber spring is constructed as a single unit having an internal shaft, with a built in compression limiter which passes back through the coils of the spring. A first end of the internal shaft is secured or hung to a stationary object (such as the top of a washing machine) while the second end of the internal shaft is surrounded by the spring and hangs down in a generally vertical orientation. The second end of the shock absorber spring is then secured or hung directly to the heavy, moving object and allows the heavy, moving object to move in a restricted, desired manner by dampening and absorbing the vibrations of the object. The shock absorber spring has an internal travel limiter which may make contact with an extended bump located at the bottom of the internal shaft wherein the internal travel limiter contacts the extended bump and prevents the shock absorber spring from over compressing.

Springs used in shock absorbers for washing machines are well known. For example, U.S. Pat. No. 4,343,452 to Bauer discloses an elastic support for a horizontally rotating washing machine or the like in which two spring support strut assemblies are disposed substantially in the middle of the machine and to either side of a vertical plane which includes the axis of rotation. Each of the spring strut assemblies is double-acting, i.e., it has an upper guide rod and a lower guide rod, each of which is surrounded by a compression spring. The top of the upper guide rod is attached to the washing machine housing and the bottom of the lower guide rod is attached to the base of the machine. The free ends of the guide rods move axially within a single guiding and damping casing which has internal passages for guiding the rods. The casing may consist of two or more parts and is so constructed that when the casing parts are clamped together with a variable force, the casing is deformed and a varying amount of radial pressure is applied by the walls of the passages to the surface of the guide rods, thereby causing a selectable amount of damping friction with respect to the axial motion of said guide rods.

Further, U.S. Pat. No. 5,606,879 to Froelicher discloses an automatic washing machine suspension system having a plurality of suspension units. Each unit includes a rod suspended from a stationary support ring. A hollow cylinder, with a cylindrical side wall and a transverse base, is connected to the moving system and is mounted around the distal end of the rod. A piston mounted on the rod within the cylinder side wall includes a circumferentially continuous skirt extending axially of the side wall. A retainer spring mounted on the rod within the skirt includes a series cantilever beam fingers biasing the piston skirt into engagement with the cylinder side wall. A washer is mounted on the rod within the fingers. A coil spring is mounted around the rod and extends between the base of the cylinder and the piston.

Still Further, U.S. Pat. No. 5,520,029 to Savkar discloses a suspension spring assembly for a washing machine having a coil spring in compression. The suspension spring system uses a snubber mounted inside the coil spring to help dampen and isolate unbalanced load excursions by using the positive displacement pumping action of air being forced through an orifice in the snubber. A second snubber may be employed with the coil spring.

However, these patents fail to describe a shock absorber spring which is easy to use and efficient as in the present device. Further, these patents fail to provide a shock absorber spring which allows a user to utilize a single unit shock absorber spring as described in the present application while increasing tensile strength and reducing weight.

SUMMARY OF THE INVENTION

A shock absorber spring is provided. The shock absorber spring is especially suitable for hanging and controlling the movement of heavy oscillating articles, such as the tub of a washing machine. The shock absorber spring is constructed as a single unit having an internal shaft and a integrated compression limiter which passes back through the coils of the spring. A first end of the internal shaft is secured or hung to a stationary object (such as the top of a washing machine) while the second end of the internal shaft is surrounded by the spring and hangs down in a generally vertical orientation. The second end of the shock absorber spring is then secured or hung to the heavy, moving object and allows the heavy, moving object to move in a restricted, desired manner by dampening and absorbing the vibrations of the object. The shock absorber spring has an internal travel limiter which may make contact with an extended bump located at the bottom of the internal shaft wherein the internal travel limiter contacts the extended bump and prevents the shock absorber spring from over compressing.

An advantage of the present shock absorber spring is that the present shock absorber spring is lightweight.

And another advantage of the present shock absorber spring is that the present shock absorber spring allows for an increased carrying load over other shock absorbers having springs of a similar size.

Still another advantage of the present shock absorber spring is that the present shock absorber spring takes up less space within the interior of an oscillating machine, such as a washing machine.

And another advantage is that the present shock absorber springs one piece construction eliminates additional assembly components required to make ordinary springs to functional.

And an advantage of the present shock absorber spring is that the present shock absorber spring greatly reduces coil compression and spring collapse as is common in other shock absorbers having springs.

Yet another advantage of the present shock absorber spring is that the present shock absorber spring has an internal travel limiter which is protected by the shock absorber spring and which prevents the shock absorber spring from over compressing and eliminates the need for an independent compression limiter.

For a more complete understanding of the above listed features and advantages of the shock absorber spring reference should be made to the detailed description and the drawings. Further, additional features and advantages of the

DETAILED DESCRIPTION OF THE PREFERRED EMBODIMENTS

A shock absorber spring is provided. The shock absorber spring is especially suitable for hanging and controlling the movement of heavy oscillating articles, such as the tub of a washing machine. The shock absorber spring is constructed as a single unit having an internal shaft which passes back through the coils of the spring. A first end of the internal shaft is secured or hung to a stationary object (such as the top of a washing machine) while the second end of the internal shaft is surrounded by the spring and hangs down in a generally vertical orientation. The second end of the shock absorber spring is then secured or hung to the heavy, moving object and allows the heavy, moving object to move in a restricted, desired manner by dampening and absorbing the vibrations of the object. The shock absorber spring has an internal travel limiter which may make contact with an extended bump located at the bottom of the internal shaft wherein the internal travel limiter contacts the extended bump and prevents the shock absorber spring from over compressing.

Figure 1:
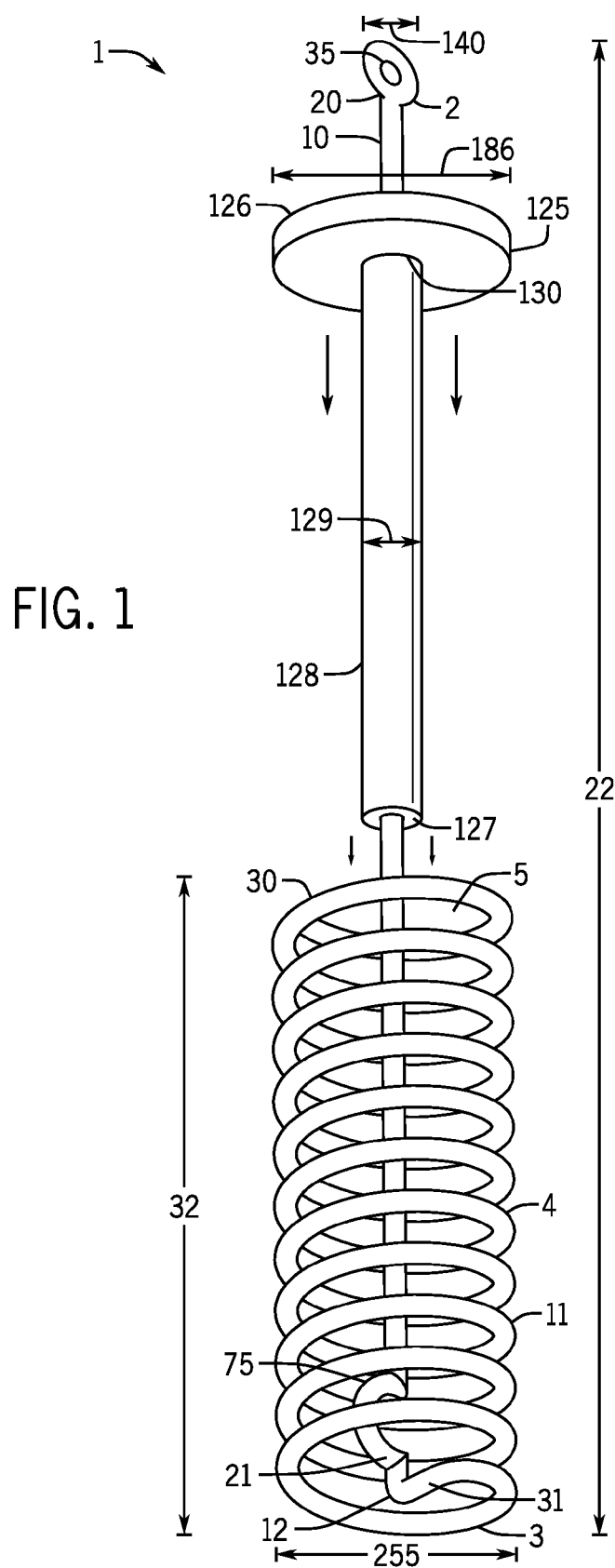
FIG. 1 illustrates a perspective view of the shock absorber spring.

Referring now to FIG. 1, in an embodiment, a shock absorber spring 1 is provided. The shock absorber spring 1 has a top 2, a bottom 3, a generally cylindrical side 4 and a generally hollow interior 5 defined by a coil portion 11. Preferably, the shock absorber spring 1 is made of a durable material such as metal or the like. In an embodiment, the metal is flexible. The shock absorber spring 1 may have, for example, a shaft portion 10 having a diameter 140, and a connector portion 12 in addition to the coil portion 11. The shaft portion 10, connector portion 12 and the coil portion 11 may be constructed as a single unit wherein the shaft portion 10 of the shock absorber spring 1 travels through and is located within the generally hollow interior 5 of the coil portion 11. Providing a shock absorber spring 1 as a single unit results in a dramatically increased tensile strength compared to shock absorbers having springs comprised of a separate spring portion and a separate shaft portion. In addition, providing a single unit shock absorber spring 1 eliminates coil compression and spring collapse as is common in other multiple unit shock absorbers having spring systems.

The shaft portion 10 of the shock absorber spring 1 may have a first end 20, a second end 21 and a length 22. The coil portion 11 may have a first end 30, a second end 31 and a length 32. In an embodiment, the first end 20 of the shaft portion 10 may be secured near, for example, a top 50 (FIG. 2) of a washing machine 100 (within the interior of the washing machine 100). In use, the shaft portion 10 (and accordingly coil portion 11) may hang downward in a generally vertical orientation so that the first end 20 of the shaft portion 10 is located largely above the second end 21 of the shaft portion 10.

In an embodiment, the coil portion 11 may partially surround the shaft portion 10 of the shock absorber spring 1. In particular, the coil portion 11 may surround less than the entire length 22 of the shaft portion 10 and may be located generally near the bottom 21 of the shaft portion 10. Although the length 32 of the coil portion 11 compared to the length 22 of the shaft portion 10 may vary a great deal depending on the desired application of the device 1, the length 32 of the coil portion 11 may be, for example, approximately one half to one third the length 22 of the shaft portion 10.

In an embodiment, the shock absorber spring 1 may have an extended bump 75. The extended bump 75 may be located, for example, near the connector portion 12 where the shaft portion 10 meets the coil portion 11. The extended bump 75 may be, for example, merely an outwardly extending bump on the shaft portion 10. In particular, the extended bump 75 may be, for example, a half-circle shaped bend in the shaft portion 10. The extended bump 75 may directly contact an internal travel limiter 125 (as defined below) and may prevent the shock absorber spring 1 from compressing beyond a predetermined point. Providing an extended bump and internal travel limiter 125 which is integrally formed as part of the shock absorber spring 1 reduces the number of moving parts of the shock absorber spring 1 and, therein, reduces the chances of a malfunction of the shock absorber.

Figure 2:
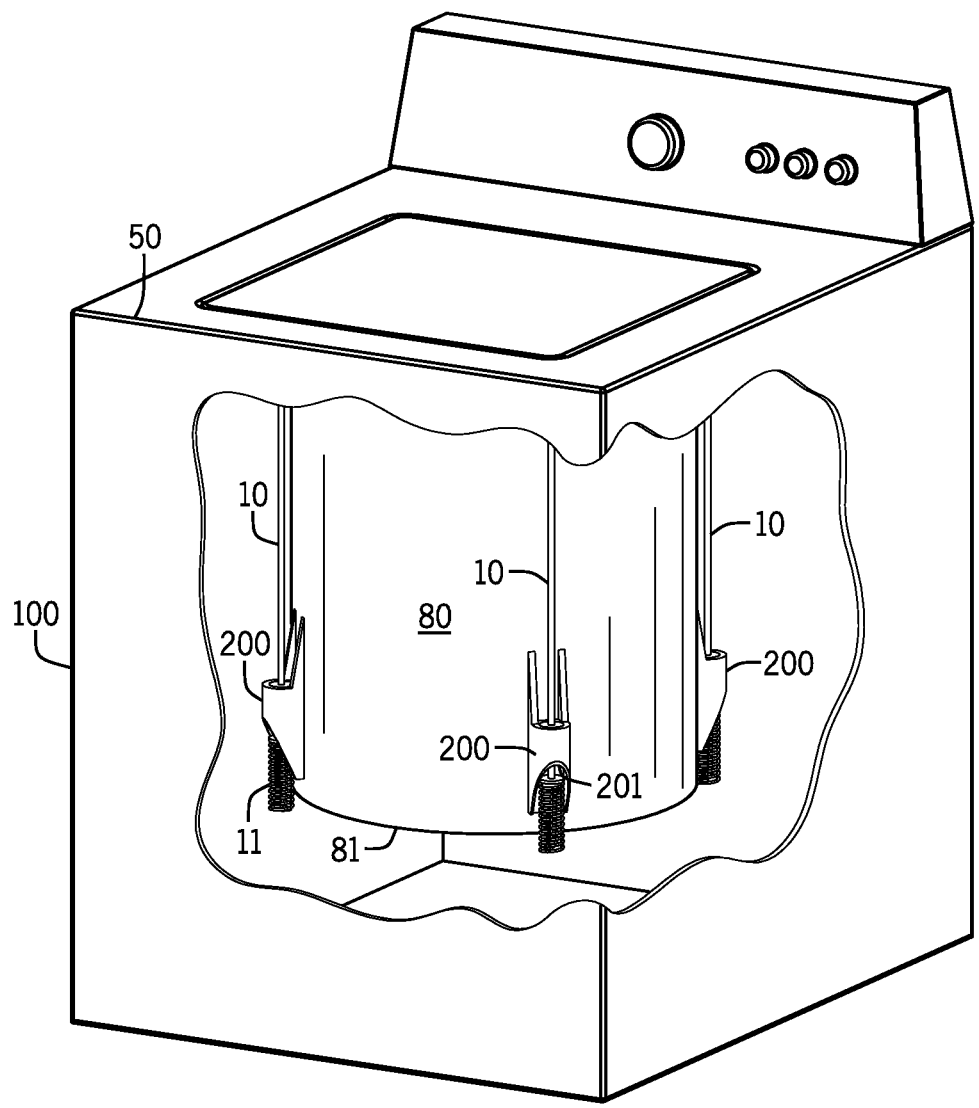
FIG. 2 illustrates a perspective view of a plurality of shock absorber springs located within the interior of a washing machine.

In an embodiment, a plurality of shock absorber springs 1 may be used in the construction of, for example, a washing machine 100. FIG. 2 illustrates four shock absorber springs 1 (three of which are visible in FIG. 2) of the present device utilized to secure or hang a tub portion 80 of the washing machine 100. In particular, the shock absorber springs 1 may be located around the tub portion 80 and secured to the bottom 81 of the tub portion 80.

The first end 20 of the shaft portion 10 may have an opening loop, hook or deflection 35 which is secured or hung directly to the washing machine 100. More specifically, the opening 35 of the first end 20 of the shaft portion 10 may be secured near the top 50 of the washing machine (within the interior of the washing machine 100). A screw or pin (not shown) may be secured through the opening, hook or deflection 35 wherein the screw or pin or ball joint allows the shock absorber spring 1 to pivot while hanging in the generally vertical orientation. In use, a plurality of the present shock absorber springs 1 may be used wherein the plurality of shock absorber springs 1 may hang down from the top 50 of the washing machine 100 in a generally, but not exactly, parallel orientation.

As stated above, the shock absorber spring 1 may have a travel limiter 125. The travel limiter 125 may have a top 126, a bottom 127 and a generally hollow shaft portion 128 wherein the generally hollow shaft portion 128 has a diameter 129. The diameter 129 of the generally hollow shaft portion 128 of the travel limiter 125 may be slightly greater than the diameter 140 of the shaft portion 10 such that the shaft portion 10 may slide (independently) through and may be located within the generally hollow shaft portion 128. A radius of the generally hollow shaft portion 128 may be less than the distance the extended bump 75 extends outward from the shaft portion 10 so that the bottom 127 of the generally hollow shaft portion 128 may not move vertically downward beyond the extended bump 75 of the shaft portion 10.

During use, the bottom 127 of the travel limiter 125 may directly contact the extended bump 75 of the shock absorber spring 1 and may prevent the shock absorber spring 1 from over compressing. More specifically, the coil portion 11 may not compress to a size smaller than the length of the generally hollow shaft portion 128 of the travel limiter 125. The top 126 of the travel limiter 125 has a diameter 186 which is greater than the diameter 255 of the coil portion 11 so as to prevent the coil portion 11 from passing above the travel limiter 125. The top 126 of the travel limiter 125 has an opening 130 which allows the shaft portion 10 to pass through. When the washing machine 100 (or other device for which the shock absorber spring 1 is secured to) is not moving or is moving normally, the compression of the coil portion 11 is reduced and the bottom 127 of the travel limiter 125 does not contact the extended bump 75 and the travel limiter 125 is therefore not utilized.

Figure 3:
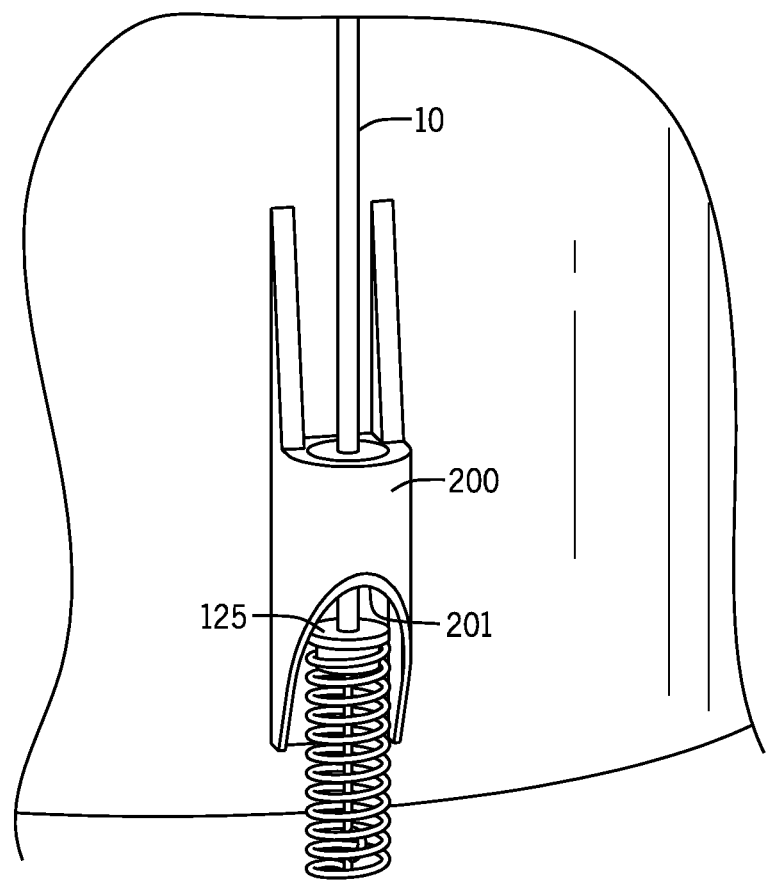
FIG. 3 illustrates a close up of the shock absorber spring secured to the bottom of the washing machine.

Referring now to FIG. 3, in an embodiment, a plurality of securing anchors 200 may be located near the bottom 81 of the tub 80 of the washing machine 100. The securing anchors 200 may have a generally hollow interior portion 201 which receives the top 126 of the travel limiter 125. As a result, the travel limiter 125, the coil portion 11 and the bottom of the shaft portion 10 of the shock absorber spring 1 remain located under the securing anchor 200.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A shock absorber spring comprising:
   an elongated shaft having a first end and a second end and a length defining the distance between the first end and the second end;
   a coil portion forming a compression spring, wherein the coil portion has a diameter, wherein the coil portion partially surrounds the elongated shaft, wherein the second end of the elongated shaft and the coil portion are connected and, wherein the second end of the elongated shaft and the coil portion form a single continuous monolithic unit;
   an extended bump portion located on the elongated shaft near the second end of the elongated shaft, wherein the extended bump portion extends outward from the elongated shaft and is located within the coil portion;
   a generally cylindrical hollow shaft unit having a first end, a second end, a length and having a generally flat top portion having an opening, wherein the generally cylindrical hollow shaft unit surrounds a portion of the elongated shaft and moves vertically with respect to the elongated shaft and, wherein the generally flat top portion has a diameter which is greater than the diameter of the coil portion; and
   wherein the second end of the generally cylindrical hollow shaft unit contacts the extended bump portion and prevents the coil portion from compressing to an overall length which is less than the length of the generally cylindrical hollow shaft unit.

2. The shock absorber spring of claim 1, wherein the shock absorber spring is made of metal.

3. The shock absorber spring of claim 2, wherein the metal is flexible.

4. The shock absorber spring of claim 1 further comprising:
   an opening forming the loop or hook located at the first end of the elongated shaft, wherein the opening forming a loop or hook is capable of receiving a screw for securing and hanging the shock absorber spring.

5. A shock absorber spring system comprising:
   an elongated shaft having a first end and a second end and a length defining the distance between the first end and the second end;
   a coil portion forming a compression spring, wherein the coil portion has a diameter, wherein the coil portion partially surrounds the elongated shaft, wherein the second end of the elongated shaft and the coil portion are connected and, wherein the second end of the elongated shaft and the coil portion form a single continuous monolithic unit;
   an extended bump portion located on the elongated shaft near the second end of the elongated shaft, wherein the extended bump portion extends outward from the elongated shaft and is located within the coil portion;
   a generally cylindrical hollow shaft unit having a first end, a second end, a length and having a generally flat top portion having an opening, wherein the generally cylindrical hollow shaft unit surrounds a portion of the elongated shaft and moves vertically with respect to the elongated shaft and wherein the generally flat top portion has a diameter which is greater than the diameter of the coil portion;
   wherein the second end of the generally cylindrical hollow shaft unit contacts the extended bump portion and prevents the coil portion from compressing to an overall length which is less than the length of the generally cylindrical hollow shaft unit;
   a receiving anchor housing having a top, an open bottom and a generally cylindrical and hollow interior, wherein the receiving anchor housing is secured to an object to be secured by the shock absorber spring; and
   an opening in the top of the receiving anchor housing, wherein the elongated shaft of the shock absorber passes through the opening of the top of the receiving anchor housing but, wherein the generally flat top portion of the generally cylindrical hollow shaft unit is prevented from vertically moving above the top of the receiving anchor housing.

6. The shock absorber spring system of claim 5, wherein coil portion is located partially within the hollow interior of the receiving anchor housing.

7. The shock absorber spring of claim 1, wherein the coil portion has a first end, a second end and an interior portion and wherein the extended bump portion of the elongated shaft is located between the first end and the second end of the coil portion and located within the interior portion of the coil portion.

8. The shock absorber spring system of claim 5, wherein the coil portion has a first end, a second end and an interior portion and wherein the extended bump portion of the elongated shaft is located between the first end and the second end of the coil portion and located within the interior portion of the coil portion.

* * * * *